No. 695,723. Patented Mar. 18, 1902.
R. HERMAN.
SIGNALING MECHANISM.
(Application filed Aug. 5, 1901.)
(No Model.) 7 Sheets—Sheet 1.
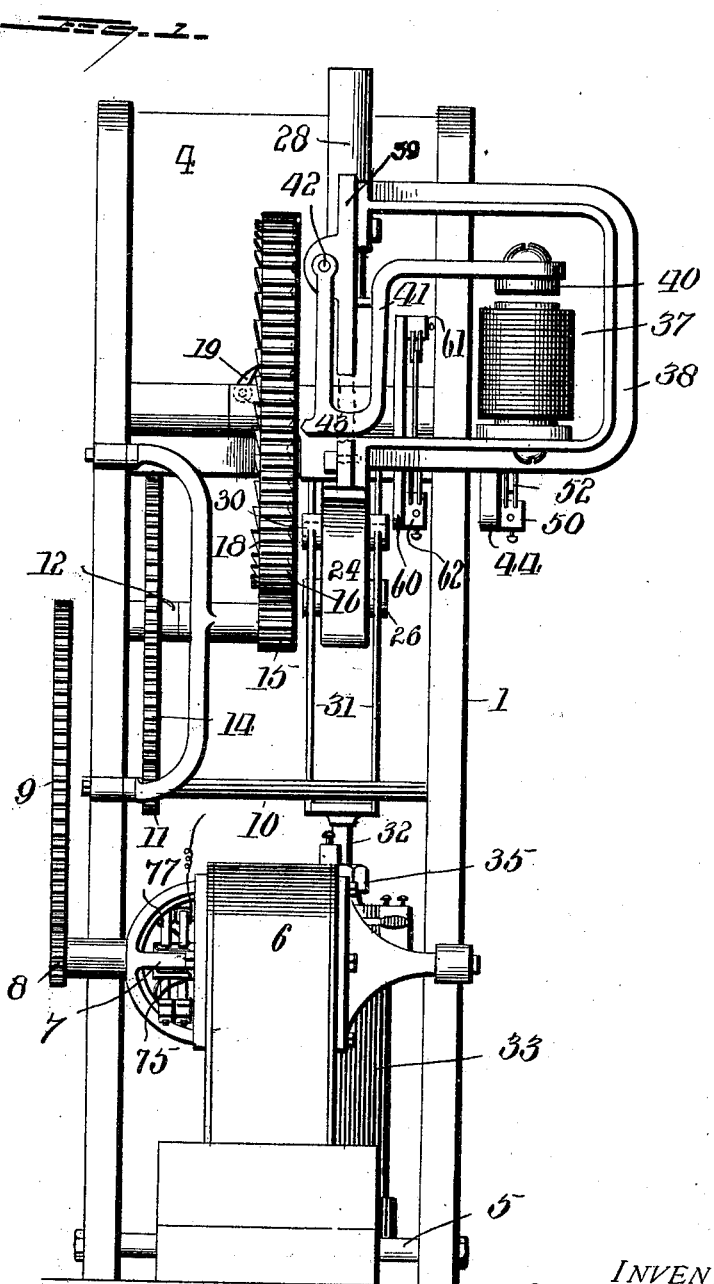
WITNESSES:
Wm F. Doyle
F. C. Barry
INVENTOR
Reinhold Herman
BY H C Evert
Attorneys

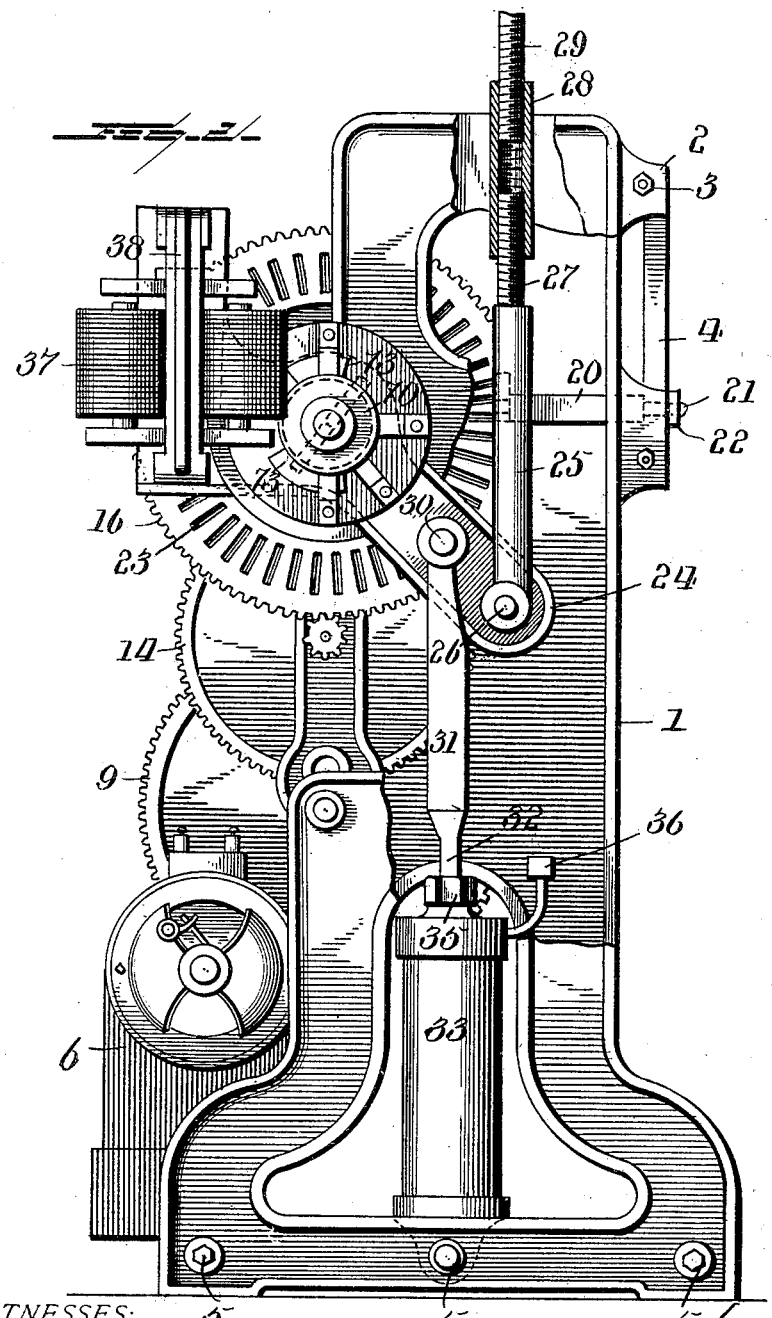

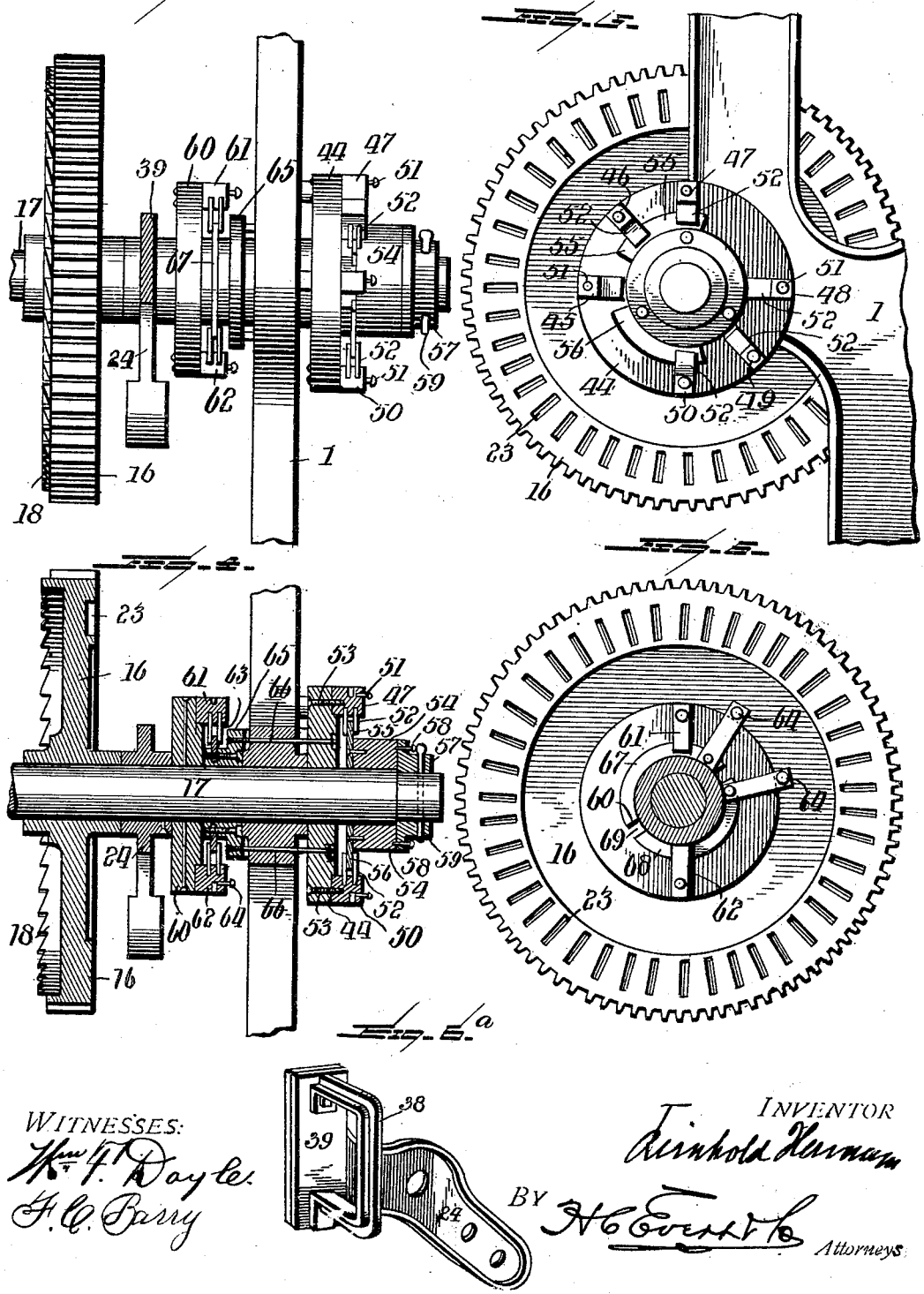

No. 695,723. Patented Mar. 18, 1902.
R. HERMAN.
SIGNALING MECHANISM.
(Application filed Aug. 5, 1901.)
(No Model.) 7 Sheets—Sheet 4.
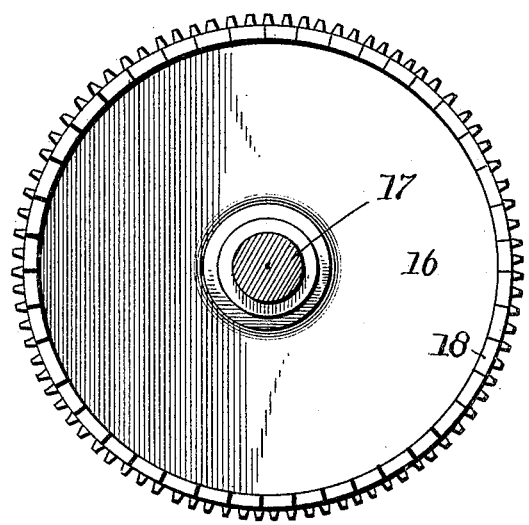
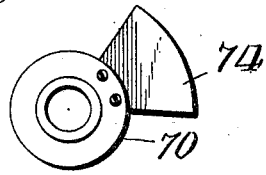
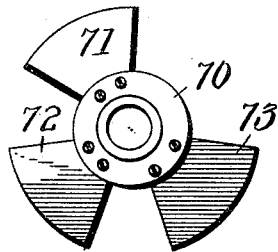
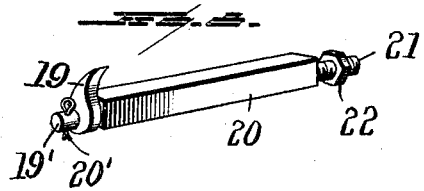
WITNESSES: INVENTOR

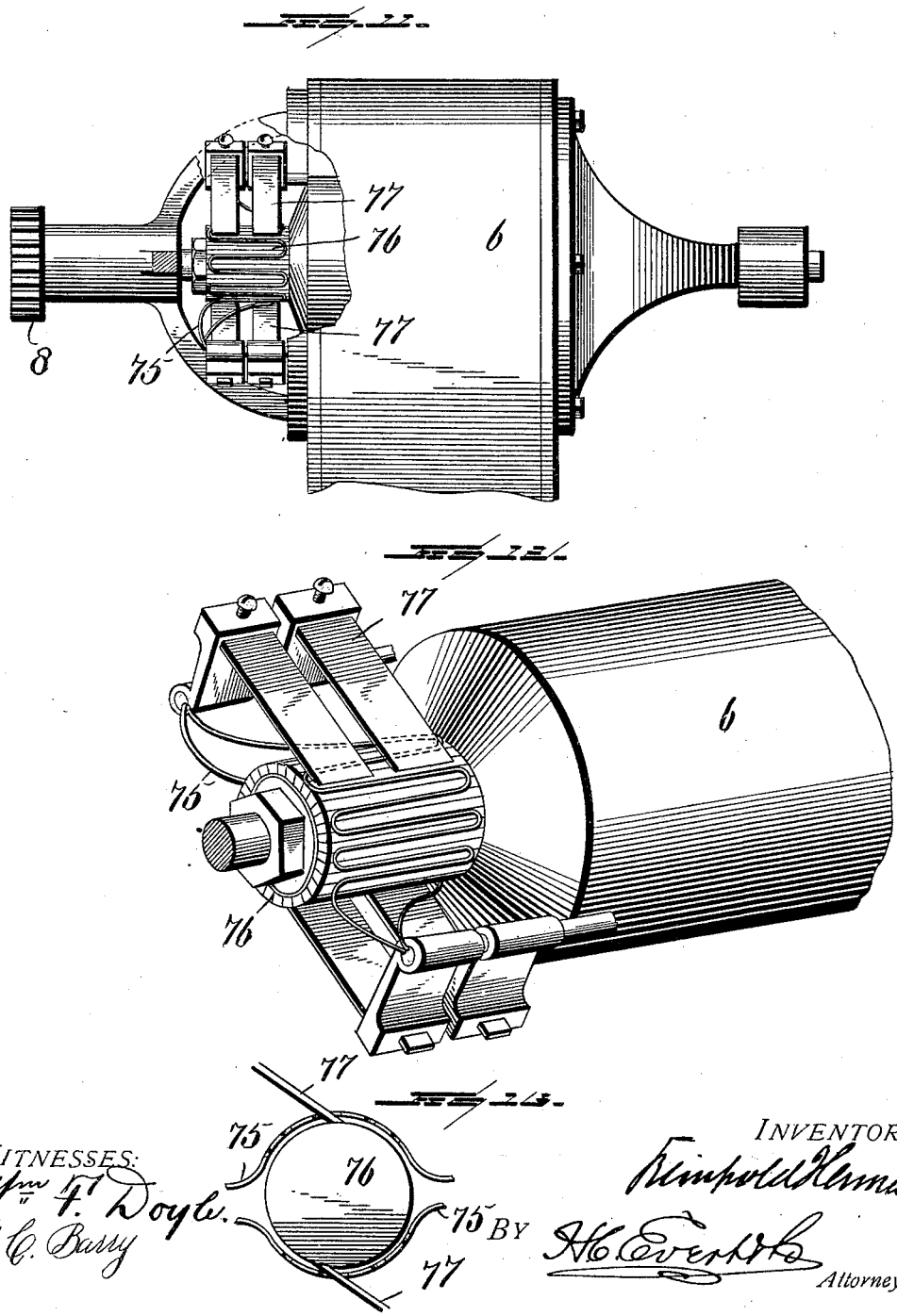

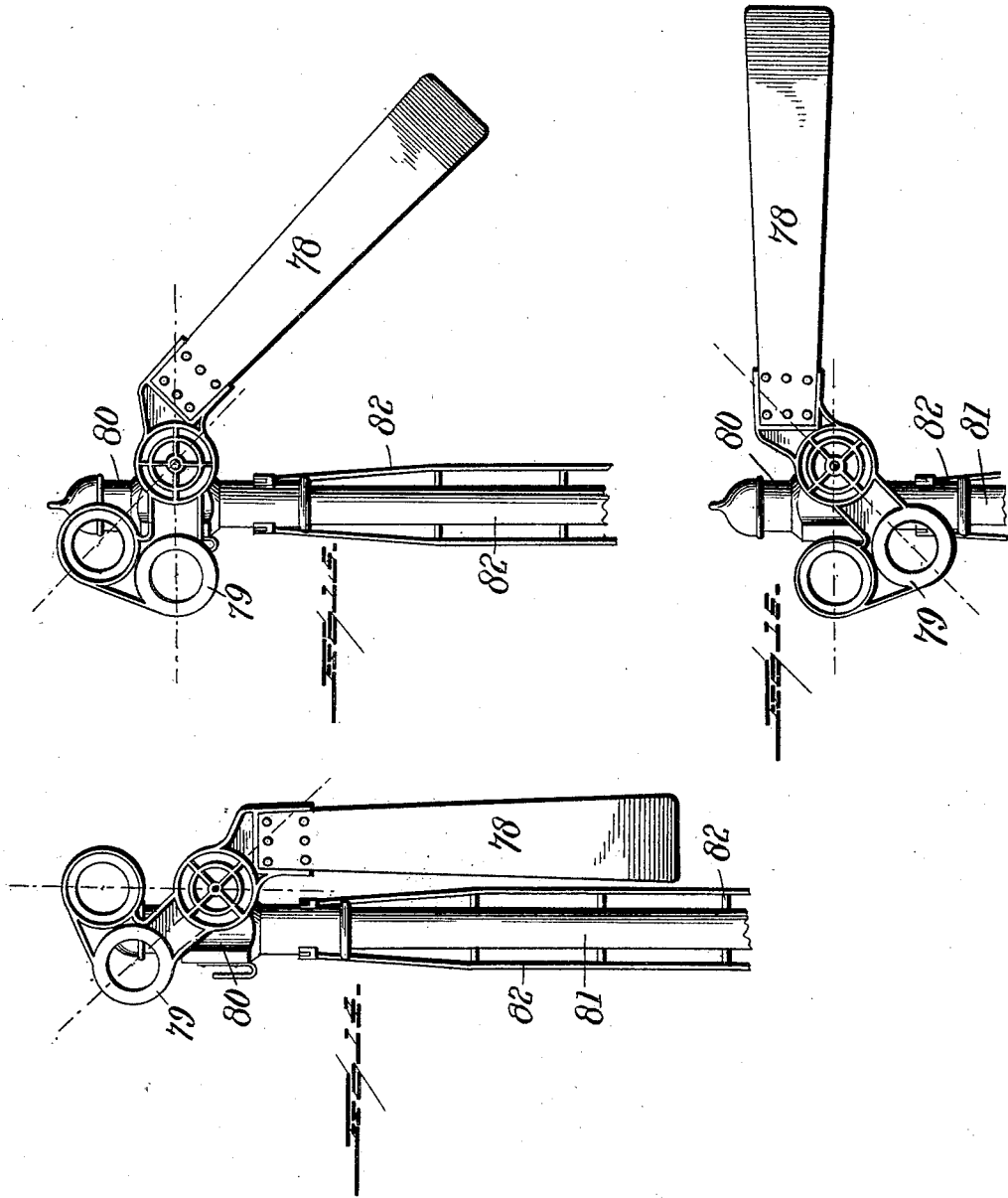

No. 695,723. Patented Mar. 18, 1902.
R. HERMAN.
SIGNALING MECHANISM.
(Application filed Aug. 5, 1901.)
(No Model.) 7 Sheets—Sheet 7.
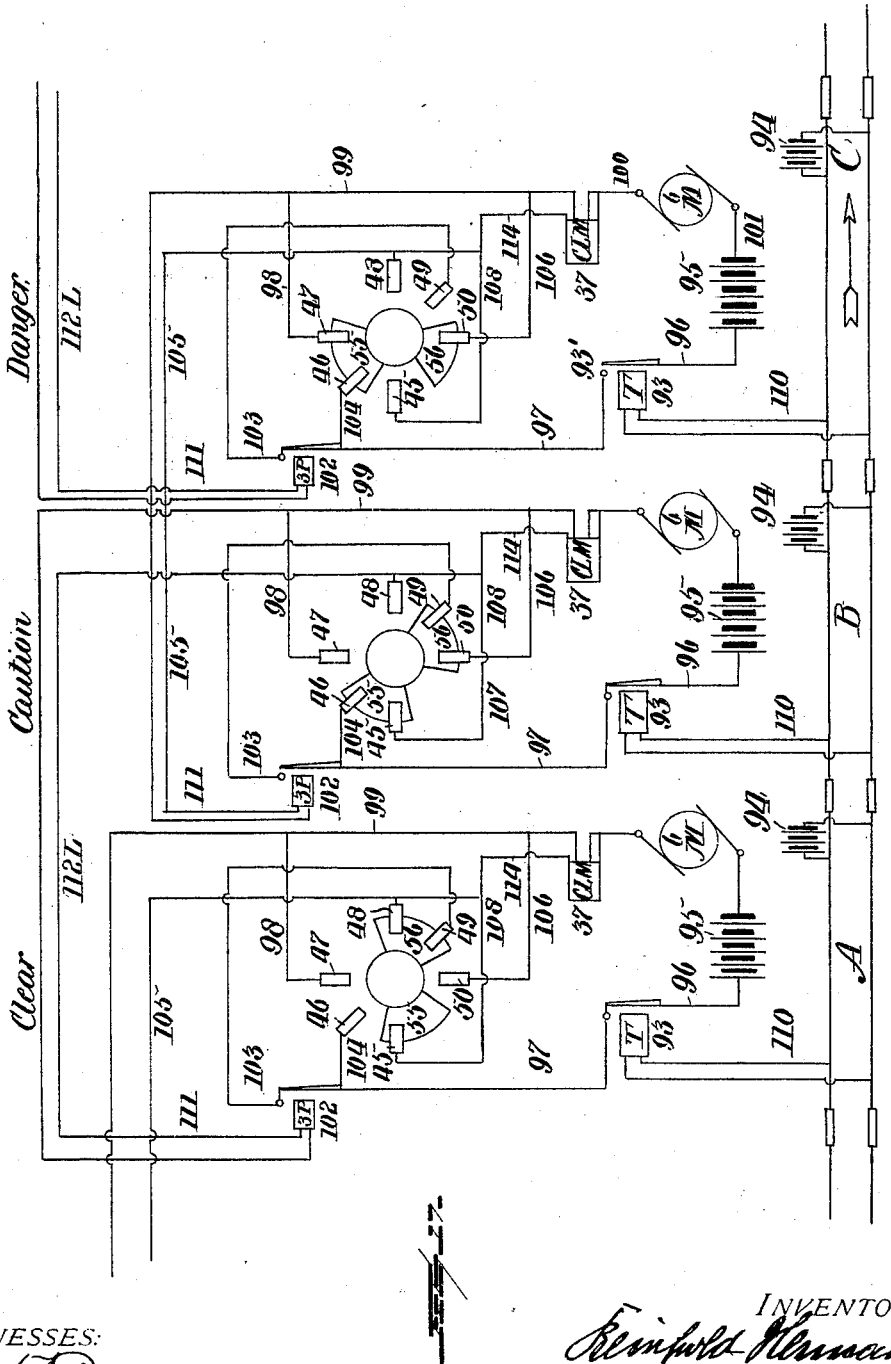

UNITED STATES PATENT OFFICE.

REINHOLD HERMAN, OF CRAFTON, PENNSYLVANIA.

SIGNALING MECHANISM.

SPECIFICATION forming part of Letters Patent No. 695,723, dated March 18, 1902.

Application filed August 5, 1901. Serial No. 70,957. (No model.)

*To all whom it may concern:*

Be it known that I, REINHOLD HERMAN, a citizen of the United States of America, residing at Crafton, in the county of Allegheny and State of Pennsylvania, have invented certain new and useful Improvements in Signaling Mechanism, of which the following is a specification, reference being had therein to the accompanying drawings.

This invention relates to certain new and useful improvements in signaling mechanism, and has for its object a construction and arrangement of operating mechanism and controlling-circuits, whereby the same signal may be employed as a home and distant signal, the movements of the signal from "clear" to "danger" and "caution" being effected automatically, but controlled by train movements.

A further object of the present invention is to construct a signal mechanism and provide controlling-circuits therefor which may be employed as a two, three, or four position signal without altering the form or general construction of the signal mechanism; and the invention further aims to provide various improvements in the signal mechanism, as will be hereinafter more fully described and then specifically pointed out in the claims.

This invention should be considered in connection with a companion application filed by me January 14, 1901, Serial No. 43,189, and in describing the present invention in detail reference will be had to the accompanying drawings, forming a part of this specification, and wherein like numerals of reference will be employed to designate like parts throughout the several views, in which—

Figure 1 is a front elevation of the signal mechanism. Fig. 2 is a side elevation thereof partly broken away and with the coupling-sleeve between the signal-operating rod and the signal mechanism in vertical section. Fig. 3 is a front elevation of a part of the signal mechanism, showing the drive-wheel, the rotary circuit-connector, and the rotary circuit-controller. Fig. 4 is a vertical horizontal sectional view of the same. Fig. 5 is a side elevation of the part of the mechanism as shown in Fig. 3. Fig. 6 is a transverse vertical sectional view through the drive-shaft, showing the drive-wheel in side elevation. Fig. 6$^a$ is a detail perspective view of the arm carried by the drive-shaft for supporting the clutch-lock magnets and to which the driving-rod and dash-pot are connected. Fig. 7 is a side elevation of the reverse side of the drive-wheel, showing the drive-shaft in transverse vertical section. Fig. 8 is a detached detail perspective view of the lock-pawl and its supporting-bolt. Fig. 9 is a detail plan view of circuit-controller blades as employed where the signal is used as a four-position one. Fig. 10 is a like view of the circuit-controller as employed when the signal is used as a two-position one. Fig. 11 is a detail side elevation of a part of the motor for the signal-operating mechanism, partly broken away and partly in section, showing the commutator and brushes with resistance-wire employed to prevent formation of ice on the commutator. Fig. 12 is a detail perspective view of the same. Fig. 13 is an end view of the commutator and wire resistance-coil, showing a part of the brushes. Fig. 14 is a side elevation of the semaphore or signal arm, showing the same in the clear or "white" position; also, showing a part of the supporting-post. Fig. 15 is a like view showing the semaphore or signal arm in the "caution" or "green" position. Fig. 16 is a similar view showing the semaphore or signal arm in the "red" or "danger" position. Fig. 17 is a diagrammatical view showing the circuits for three blocks or sections or track, showing the circuit-controllers in the position they occupy in the respective three positions of the signal.

The improvements in the present invention are shown and described in connection with the semaphore type of signal, but are not necessarily limited to this type or style, as it will of course be evident that the same form of signal-operating mechanism and the same circuits could be employed for operating signals of other than the semaphore type.

I will now describe the signal-operating mechanism with reference to the drawings, wherein—

1 indicates the standards or uprights, each of which is preferably cast in one piece and carry on their rear edge, near the upper end thereof, projections or bosses 2, to which is securely fastened by bolts 3 or other suitable means a bridge-plate 4. The two standards are thus spaced apart and rigidly connected at their upper ends, and at their lower ends they are connected and braced by means of bolts 5, on one of which the actuating-motor is mounted and on another of which the cushioning dash-pot is mounted. The motor and dash-pot in this form of mechanism are adjustably mounted on these bolts, whereby they may be properly alined, as is fully shown and described in the companion application heretofore referred to, and hence not shown in detail in this application.

The signal mechanism is preferably actuated to shift the signal by means of a motor 6, the armature-shaft 7 of which carries a high-speed pinion 8 to mesh with a gear 9, carried on the one end of a shaft 10, journaled in the standards or uprights 1 above the motor. This shaft 10 also carries a small pinion 11, which meshes with a gear 14, that is carried on a shaft 12, journaled in one of of the uprights or standards, and the shaft 12 also has mounted thereon a pinion 15, which meshes with the gears or teeth on the periphery of the main driving clutch-wheel 16. This main driving-wheel 16 is mounted on the drive-shaft 17, which is journaled in the two uprights or standards and has the rotary circuit-controller and the rotary circuit-connector mounted thereon, besides being connected up to the semaphore or signal arm in a manner as will be hereinafter explained. This clutch-wheel 16 is provided on one side or face adjacent to the rim thereof with circumferentially-arranged notches forming ratchet-teeth 18, which are engaged by a pawl 19, carried on a bolt 20, rigidly secured in the bridge-plate 4. This bolt is preferably constructed as shown in detail in Fig. 8, comprising a body portion substantially square in cross-section with a rounded shank 19' on its inner end, on which the pawl is pivotally mounted, being restrained thereon by a key 20' or in any suitable manner. The other or outer end of the bolt has a round threaded shank 21, which is passed through the bridge-plate and receives a nut 22 for firmly securing the bolt in position. The clutch-wheel on the reverse side to that having the ratchet-teeth 18 is provided with circumferentially-arranged notches 23, which are spaced about equally to the ratchet-teeth 18. These notches are rectangular and in cross-section are substantially V-shaped, the side walls of the notches being inclined, so that the dog of the clutch-lock magnet will readily enter the same.

Connected onto the drive-shaft 17, adjacent to one side of the drive-wheel 16, is an arm 24, near the outer end of which a yoke 25 is connected by means of a pivot-pin 26. This yoke has a threaded end 27, that is connected by means of the threaded coupling-sleeve 28 to the threaded end 29 of the operating-rod that connects with the semaphore or signal arm for operating the same. Either the end 29 of the rod is made with a right-hand thread and the end 27 of the yoke 25 with a left-hand thread, or vice versa, and the coupling-sleeve 28 is made with a right-hand thread in one end and a left-hand thread in the other end to accommodate these threads on the parts 27 29. The sleeve is employed for adjusting the length of driving-rod and may be provided intermediate its ends with square, octagonal, or other like faces to receive a wrench to adjust the sleeve or it may be provided with holes to receive an instrument to turn the same in the manner of a turn-buckle, as will be readily apparent.

Connected to the arm 24, intermediate of the pivot-pin 26 and the drive-shaft 17 by means of a pivot-pin 30, is a yoke 31, which is connected to the piston-rod 32 of a piston (not shown) that operates in the dash-pot 33. This dash-pot is mounted for adjustment on one of the bolts 5, so that it may be moved to properly aline the same with the mechanism. The piston-rod 32 passes through a stuffing-box 35, which may be of the ordinary form of construction, and the dash-pot is provided with a suitable air-vent 36.

In the invention shown and described in the companion application heretofore referred to I employ a sector, carried by the drive-shaft and engaged by a lock controlled by lock-magnets, and also employ clutch-magnets to engage the main driving clutch-wheel when the motor is energized. In this invention, however, I dispense with the sector and with one set of magnets and employ but one set of magnets, which I herein term the "clutch-lock" magnets. In lieu of the sector, the locking mechanism, and the lock-magnets I employ the ratchet and pawl and lock up direct on the main driving clutch-wheel. These clutch-lock magnets are given a compound winding with two different sizes of wire, the coarser winding connected in series with the motor and with one clip of the circuit-controller (in three-position signal) and the finer wire in series with the motor and the other clip of the circuit-controller, so that when the signal is being driven into position by the motor the current is passing over the heavier winding; but when the signal is in position as controlled by the circuit-controller the motor is cut out and the finer winding is shunted in, there being sufficient current over the finer winding to hold the signal at the position to which it has been moved, while a closed current has been maintained during the shifting of the signal. These clutch-lock magnets 37 are mounted in a bracket or frame 38, which is secured to an arm or extension 39 (see Figs. 1 and 3) of the arm 24. The armature 40 of the magnets has connected thereto a swinging lock clutch-lever 41, which is pivotally suspended, as at 42, from the arm or extension 39, the engaging end or tooth 43 of the clutch-lever 41 being V-shaped to engage in the V-shaped notches or recesses 23 in the side of the wheel 16.

The motor-circuit and the circuit for energizing the clutch-lock magnets are controlled in the movement of the signal and its operating mechanism, in this case an electric motor constituting electrically-operated means for operating the signal and a circuit-controller, which will be described in detail, with reference particularly to Figs. 3 and 4 of the drawings. This circuit-controller comprises an insulated disk 44, which is mounted on the shaft 17 and rigidly secured to one of the standards or uprights in any suitable manner. This insulated disk carries on its outer face contact-blocks 45 46 47 48 49 50, each block having a binding screw or post 51 and a pair of spring-clips 52. The contact-blocks may be held by screws 53, passing through the insulated disk 44 into the blocks or in any approved or desired manner. An insulated sleeve 54 is mounted on the drive-shaft 17 and rigidly secured thereto, so as to revolve with the shaft, and this sleeve 54 carries contact-blades 55 56, by means of which the circuit is controlled. The insulated sleeve 54 is rigidly secured to the drive-shaft by a collar 57, mounted on the end of the drive-shaft and secured to the sleeve 54 by screws 58 or other desired means, the collar being secured on the shaft by a pin 59, passing through the said collar and shaft.

In order to dispense with all hanging connecting-wires, I employ a rotary circuit-connector comprising an insulated disk 60, rigidly mounted on the drive-shaft 17. This disk 60 carries contact-blocks 61 62, each of which carries a pair of contact springs or clips 63 and a binding-post 64. Also mounted on the drive-shaft 17 is an insulated collar 65, which is rigidly connected to one of the standards or uprights by screws 66, and this collar carries contact plates or segments 67 68, with air-gaps 69 between their ends. (See Fig. 6.)

In Figs. 9 and 10 of the drawings I have shown detail plan views of the contact-blades and insulated sleeve of two modifications of circuit-controller. In these two views the numeral 70 indicates an insulated sleeve that is to be mounted on the drive-shaft 17, this sleeve corresponding to the sleeve 54, heretofore described, and in Fig. 9 the numerals 71 72 73 indicate the contact-blades, three of these blades being provided in order that the signal may be used as a four-position signal when desired. In Fig. 10 the numeral 70 indicates the insulated sleeve, to which is secured but one contact-blade 74, this construction of circuit-controller being adapted for use when it is desired to employ the signal as a two-position signal.

In the adaptation of the signal to either a two-position or a four-position signal it will of course be understood that the spring-clips carried by the contacts on insulated sleeve 44 will be increased or decreased in number accordingly to whether one or three blades are employed, the number of contacts on said sleeve being also increased or decreased; but with the exception of this change in the circuit-controller the signal mechanism will be identical with that shown and described in detail for the three-position signal.

In practice in electric signaling it has been found that in times of cold weather the formation of ice on the commutator of the motor acts as an insulator to low-tension currents and prevents the motor from starting freely. In order to overcome this feature, I introduce a resistance-wire 75, composed of platinum or other metal, and by sending an electric current over the wire from the same source of electricity as the motor is supplied from this wire becomes heated, and, being placed within close proximity to the commutator 76 and brushes 77, as shown in detail in Figs. 11, 12, and 13, any ice that may have formed on the commutator will be at once melted, since the commutator is within the radiation of heat of the resistance-wire 75, so that the motor will immediately begin to work when energized.

In Figs. 14, 15, and 16 the semaphore or signal is shown in its respective white or clear position, green or caution position, and red or danger position. The semaphore or signal-arm 78 is carried by the spectacle-frame 79, that is pivotally secured to a head 80, that is mounted for adjustment upon the hollow supporting-post 81. This supporting-post is mounted upon the inclosing box or casing (not shown) for the signal-operating mechanism, a ladder 82 leading up to the top of the post to permit access to the semaphore or signal arm when desired. The signal-head is mounted upon the post 81, so it may be adjusted axially thereon in order that the semaphore or signal arm may be adjusted so as to aline the same with the track irrespective of the position in which it may be found desirable or necessary to place the signal-operating mechanism; but as this rotatable head has been made the subject of a separate application it is not shown or described in detail herein. In this connection, however, I desire to call particular attention to the manner in which the semaphore or signal arm 78 is suspended from the head 80, as illustrated in Figs. 14, 16. The semaphore in Fig. 14 is shown in its white or clear position, and it will be observed that the spectacle frame or casting 79 is moved in line with the driving-shaft, but still maintaining enough counterbalance-weight to insure a safe release, due to the semaphore or signal arm 78 not acting as a counterbalance against the spectacle frame or casting 79 when the signal is in the white or clear position. Now in Fig. 15, where the semaphore or signal arm is shown in the green or caution position, the said arm is acting as a counterbalance to the spectacle frame or casting, while there has been more weight introduced on the spectacle frame or casting, due to having moved that portion thereof that did not hang over the center of the driving-shaft at substantially right angles to same, and thereby counteracting the weight of the blade or semaphore. Then, in Fig. 16, where the blade is shown in its red or danger position, it will be observed that the greatest amount of weight in the spectacle frame or casting 79 has been shifted below the horizontal line, obtaining a greater amount of counterweight to the blade or semaphore and insuring a positive red signal. It will be observed, therefore, and by actual test has been demonstrated, that during the movement of the blade or semaphore from danger to clear position the load is the same, due to the spectacle frame or casting changing its weight by being shifted to different distances from the driving shaft or fulcrum.

In signals of the semaphore type as heretofore operated the motor-circuits and the circuit for energizing the lock-magnets are controlled in accordance with the movements of the mechanism and have circuit-breakers so arranged with reference to a movable part of the signal-operating mechanism or the signal as to be opened and closed in a predetermined order. In my present invention, as in that shown and described in application filed January 14, 1901, Serial No. 43,189, while the motor-circuits and the circuit for energizing the lock-magnets (which magnets in this invention serve as both the lock and the clutch magnets) are operated in accordance with the movements of the mechanism, I employ a normally closed circuit which is adapted to be opened only at the track-relay by the track-circuit, and included in this normally closed circuit is the rotary circuit-controller operated by the driving-shaft of the operating mechanism, and through which circuit-controller a circuit is at all times completed to the battery irrespective of the position of the circuit-controller. In my application, Serial No. 43,189, the circuit is completed through the motor, clutch-magnets, and lock or releasing magnets in series; but in the present invention, where I employ but one set of magnets to perform the functions of the clutch-magnets and the lock-magnets, the circuit is completed when the motor is energized through the coarse winding of the clutch-lock magnets through motor to battery, and when the signal has been moved to the desired position and circuit-controller has operated so as to shunt in the fine winding of the clutch-lock magnets the current passing through motor will be insufficient to operate the same, but sufficient to hold the signal in its position, the circuit being at all times closed.

To now more clearly describe the operation reference will be had to Fig. 17 of the drawings, in which are shown three blocks or sections of track, indicated as A, B, and C. The representation of the signal for block or section A of the track is shown in the white or clear position, that for block or section B in the green or caution position, and that for block or section C in the red or danger position. Assuming now that a train has entered the block or section C, moving in the direction indicated by the arrow, these three signals will at this time (provided of course that no part of the train still occupies block or section B) be in the respective positions shown, namely—the signal for block or section C being at red or danger position, due to the train being within this block or section C, the signal for block or section B will be at green or caution position, indicating that block C is occupied by a train, and signal in block or section A will be at clear or white position, indicating that block or section A is clear. Referring now to the signal shown in danger or red position for block C, it will be observed that when the train enters the block or section C, thereby shunting the track-relay 93, (of this block or section C,) opening its contact 93', opening the circuit from the motor-battery 95, releasing the clutch-lever 41 and allowing the signal to go to the red or danger position, it has moved contact-blade 55 into engagement with the clips carried by contacts 46 47 and blade 56 into contact with the clips carried by contact 50. This signal (of block C) is automatically held in this red or danger position as long as the train remains in this block or section. When the last pair of wheels of the train passed out of block B into block or section C, the track-relay 93 (of block B) became energized, closing the contact 93' of block B and completed a circuit (over the finer winding of clutch-lock magnets) leading to the signal of this block B. On the completion of the circuit in this block B the signal mechanism of block or section B operates to place the signal in the green or caution position, thereby bringing the circuit-controller into the position, so that the contact-plate 55 is moved into contact with the spring-clips carried by contact 45, and the contact-plate 56 is moved into contact with the spring-clips carried by contact 49. Upon the engagement of plate 55 with the clips carried by contact 45 (of signal in block B) the clutch-lock magnet is shunted into the motor-circuit and a circuit is completed over wire 107, wire 108, wire 114, through the finer winding in clutch-lock magnets 37, wire 100, motor 6, and over wire 101 to battery 95. Immediately upon the clutch-lock magnets 37 of the signal in this block or section B being shunted into the motor-circuit the plate 55 passed out of engagement with the clips carried by contact 47, and the contact-plate 56 passed into engagement with the clips carried by contact 49, thereby forming a circuit on the signal of block or section B for the three-position relay 102, located in the block or section B, leaving the clutch-lock magnet of this block in series with the motor. The signal at this time in block or section C, which is the block or section occupied by the train, is in red or danger position, and the signal in the block or section B is in the green or caution position. The passing of the train, however, from block or section B into block or section C closed the three-position relay 102 of block or section A, thereby closing the motor-circuit of this signal for block or section A and allowing the signal to go to white or clear position, this three-position relay being closed by wire 96, contact 93', wires 97 104, plate 55, over clips of contacts 45 46, wires 107 108, line 111 through three-position relay 102, (of signal in block A,) wires 112 99, clutch-lock magnet 37, wire 100, motor 6 to battery 95 over wire 101. The signal of block or section A while the train is in block or section B would be in the green or caution position, and the passing of the train into block or section C allowed the signal in block A to go to white or clear position. As this signal in block A moves from green to caution position (the position shown for signal in block A) the circuit-controller is actuated so as to move blade 55 out of the clips of contact 46, but remaining in engagement with the clips of contact 45. During this movement of the blade 55 blade 56 is moved from the clips of contact 50 into engagement with the clips of contact 48, thereby shunting in the motor-circuit (of signal in block A) through wires 108 114, clutch-lock magnets 37, wire 100, motor 6, wire 101, battery 95, wire 96, contact 93', wire 97, contact 103, wire 105, and clips of contact 49 over plate 56 to clips of contact 48, the beginning of the circuit, locking the signal in the white or clear position. In this showing of the circuits in Fig. 17 the track-relays 93 are connected to the track by wires 110, and the three-position relay 102 of each signal is connected to the line-wires 112 of the succeeding block or section by wires 111.

It will be observed in this system the signals are operative with the movements of a train in either direction, as assuming that a train which is in block or section C for some reason backs into block or section B the signal in block or section B immediately goes to red or danger position, thereby opening up the three-position relay 102 of signal for block or section A and causing the signal of this section or block A to go to green or caution position, and thereby showing a green or caution signal in advance of train.

The clutch-lock magnets and the swinging clutch-locking lever in this invention perform the functions of the clutch-magnets and lock-magnets in my companion application Serial No. 43,189, as the magnets 37 when the signal is being shifted into position will actuate the swinging clutch-lever to engage same with the drive-wheel and shift the signal into the position as controlled by the circuit-controller. When the signal is in position, the clutch-lock magnets will remain locked with the drive-wheel; but the motor having been cut out by shunting in the finer winding of the magnet the movement of the signal ceases and the drive-wheel drifts back sufficiently for the pawl 19 to engage with the ratchet-tooth 18 corresponding to the notch 23 in the wheel 16, with which the swinging clutch-lever is in engagement. This "drifting" is extremely slight, as the ratchet-teeth 18 on the one side of the wheel correspond to the notches 23 on the opposite side. When, however, the track or three-position relay is opened, it will immediately release the swinging lock-clutch lever and allow the signal to go to red or danger position. It will be noted, therefore, that the drive-wheel is engaged for the purpose of electrically driving the semaphore and also for locking the same; but when the semaphore has been driven to the position controlled by the circuit-controller mechanical means is employed for engagement with the drive-wheel to prevent machine from drifting in the opposite direction to that in which the motor has driven it. This mechanical locking means is therefore supplemental to the lock effected between the swinging lock-lever and the drive-wheel and serves to relieve the lock-lever of the strain that would be on the same were it compelled to hold the signal in the position to which it had been driven. It will also be observed that when the motor is energized and the signal is being driven into position the current is directed over the coarser winding of the clutch-lock magnets; but when in position and motor is cut out and the finer winding of the magnets is shunted in the current will hold the semaphore in position by being directed over the finer winding, thereby shunting out the motor and maintaining a closed circuit.

Having fully described my invention, what I claim as new, and desire to secure by Letters Patent, is—

1. In a signal mechanism, the combination of a signal automatically movable to danger position, electrically-operated mechanism including a clutch-lock magnet and a swinging clutch-lever for locking the signal at caution and clear positions, a circuit-controller operated by the driving means for controlling the lock-circuit during the movement of the signal from danger to clear position, and means normally acting to operate the circuit-controller during the movement of the signal from clear to danger position.

2. In a signal mechanism, the combination of a signal automatically movable to danger position, electrically-operated mechanism including a clutch-lock magnet for shifting the signal, a motor for operating said mechanism, a circuit-controller operated by train movements and adapted to continuously maintain a closed motor-circuit through the clutch-lock magnet during the movement of the signal to a caution and clear position, and mechanical locking means for holding the signal at caution position.

3. In a signal mechanism, the combination of a signal automatically movable to danger and caution positions, electrically-operated mechanism including a clutch-lock magnet for shifting the signal and holding the same at caution and clear positions, a motor for operating said mechanism, means in the motor-circuit and adapted to be operated by train movements for continuously maintaining a closed motor-circuit through the clutch-lock magnet during the shifting of the signal, and mechanical locking means for engagement with the operating mechanism to hold signal after being shifted to position.

4. In a signal mechanism, the combination of a signal automatically movable to danger position, electrically-operated mechanism controlled by train movements for operating the signal, a clutch-lock magnet included in the operating mechanism and having compound windings over one of which the current is directed as the signal is being shifted into position and over the other of which the current is directed when the signal is at caution or danger position, and means electrically controlled and operated by train movements for controlling the circuit in the manner set forth.

5. In a signal mechanism, the combination of a signal automatically movable to danger position, electrically-operated mechanism for operating said signal, a motor for operating said mechanism, and a clutch-lock magnet having compound windings over the coarser of which windings the current is directed during the driving of the signal, and over the finer winding of which the current is directed when the signal has been driven into position.

6. In a signal mechanism, the combination of a signal automatically movable to danger position, electrically-operated mechanism for operating said signal, a motor for operating said mechanism, a clutch-lock magnet having compound windings over the coarser winding of which the current is directed during the driving of the signal into position, and over the finer winding of which the current is directed when the signal has been driven into position, and a circuit-controller for continuously maintaining a closed motor-circuit during the shifting of the signal.

7. In a signal mechanism, the combination of a signal automatically movable to danger position, means controlled by train movements for operating said signal, a clutch-lock magnet having compound windings over one of which the current is directed during the driving of the signal into position and over the other of which the current is directed when the signal is in position, means controlled by train movements for controlling the circuit and for maintaining a continuously-closed circuit through the clutch-lock magnet during the shifting of the signal from clear to danger and danger to caution positions, and mechanical means for locking the signal after same is driven into position.

8. In a signal mechanism, the combination of a signal automatically movable to danger and caution positions, mechanism for shifting the signal to caution and clear positions, a motor for actuating said mechanism, an automatic rotary circuit-controller in the motor-circuit for continuously maintaining a closed moter-circuit during the shifting of the signal from danger to caution and from caution to clear positions, and a clutch-lock magnet acting both to drive the signal to, and lock the same in position.

9. In a signal mechanism, the combination of a signal automatically movable to danger position, mechanism including an arm connected to the signal for shifting the signal to caution and clear positions, a motor for operating said mechanism, means in the motor-circuit for continuously maintaining a closed motor-circuit during the movement of the signal from danger to caution and from caution to clear positions, and mechanical means for engagement with the signal mechanism to hold the signal against drifting after having been shifted into caution position.

10. In a signal mechanism, the combination of a signal automatically movable to danger position, mechanism including a driving clutch-wheel and a clutch-lock magnet for operating said signal, a motor for operating said mechanism, the clutch-lock magnet adapted to engage with the clutch-driving wheel to drive the signal into position and to remain locked with said wheel after the signal has been driven into position.

11. In a signal mechanism, the combination of a signal automatically movable to danger position, mechanism including a driving clutch-wheel and a clutch-lock magnet for operating said signal, a motor for operating said mechanism, the clutch-lock magnet adapted to engage with the clutch-driving wheel to drive the signal into position and to remain locked with the wheel after the signal has been driven into position, and means adapted to engage said wheel to hold the signal after same is driven into position.

12. In a signal mechanism, the combination of a signal automatically movable to danger position, mechanism including a clutch-driving wheel and a clutch-lock magnet for operating said signal, means for operating said mechanism, the clutch-lock magnet adapted to engage with one side of the clutch-driving wheel to drive the signal into position and remain locked with the wheel after the signal has been driven into position, and means adapted to engage with the opposite side of said wheel to hold the signal after the same is driven into position.

13. In a signal mechanism, the combination of a signal automatically movable to danger position, mechanism including a clutch-driving wheel and a clutch-lock magnet for operating said signal, means for operating said mechanism, said clutch-driving wheel having notches in one side and ratchet-teeth on the other side, a swinging clutch-lever connected to the clutch-lock magnet and adapted to engage in one of the notches in the drive-wheel to drive the signal into position, and a pawl adapted to engage with the ratchet-teeth on the opposite side of said wheel to hold the signal after same has been driven into position.

14. The combination of a drive-shaft, an arm mounted on said drive-shaft, a signal-arm connected to the arm mounted on the drive-shaft, a driving clutch-wheel mounted on the drive-shaft, said wheel having notches in one face and a corresponding number of ratchet-teeth on the opposite face, a motor geared to the driving clutch-wheel, a swinging clutch-lever, a clutch-lock magnet to which the said lever is connected, and a pawl for engagement with the ratchet-teeth on the driving clutch-wheel, substantially as described.

15. In a signal mechanism, the combination of a signal automatically movable to danger position, means controlled by train movements for operating said signal, a clutch-lock magnet having compound windings over one of which the current is directed during the driving of the signal into position and over the other of which the current is directed when the signal is in position, and means controlled by train movements for controlling the circuit.

16. In a signal mechanism, the combination of a signal automatically movable to danger position, means controlled by train movements for operating said signal, a clutch-lock magnet having compound windings over one of which the current is directed during the driving of the signal into position and over the other of which the current is directed when the signal is in position, means controlled by train movements for controlling the circuit, and supplemental means for holding the signal when the same has been driven into position.

17. The combination of a signal-operating mechanism including a drive-shaft, a drive-wheel mounted thereon, a swinging lock-lever adapted for locking engagement with said drive-wheel, an arm mounted on the drive-shaft, a signal-arm connected to the arm on the drive-shaft, and means connected to the signal-arm and so mounted as to exert the greatest amount of counterweight to the signal-arm when the latter is in the danger position, substantially as described.

18. The combination of a signal-operating mechanism including a drive-shaft, a drive-wheel mounted thereon, a lock-lever adapted for locking engagement with said drive-wheel, a signal-arm connected to the drive-shaft, and a spectacle frame or casting to which the signal-arm is connected, said spectacle frame or casting being so mounted as to exert the greatest amount of counterweight to the signal-arm when the latter is in the danger position, substantially as described.

19. In a signal mechanism, the combination of a signal, mechanism for operating said signal including a drive-shaft, a drive-wheel mounted thereon, and a lock-lever adapted for locking engagement with the drive-wheel, a motor for operating said mechanism, and a heat-producing coil surrounding the commutator of said motor, substantially as described.

20. In a signal mechanism, the combination of a signal, electrically-operated mechanism for shifting said signal, a circuit-controller operated by train movements and adapted to continuously maintain a closed motor-circuit during the shifting of the signal, a motor for operating said mechanism, and a heat-producing coil for the commutator of said motor, the said coil connected direct to the same source of electricity as supplies the motor, substantially as described.

21. In a signal mechanism, the combination of a signal, electrically-operated mechanism controlled by train movements for operating the signal, a motor for operating said mechanism, and a heat-producing coil for the commutator of said motor, the coil having its ends connected to the same source of electricity as supplies the motor, substantially as described.

In testimony whereof I affix my signature in the presence of two witnesses.

REINHOLD HERMAN.

Witnesses:
JOHN NOLAND,
E. E. POTTER.